(12) United States Patent  
Hu et al.

(10) Patent No.: US 11,175,464 B2  
(45) Date of Patent: Nov. 16, 2021

(54) OPEN ENDED SPRING BODY FOR USE IN AN OPTICAL FIBER CONNECTOR

(71) Applicant: SENKO ADVANCED COMPONENTS, INC, Marlborough, MA (US)

(72) Inventors: Guanpeng Hu, Shanghai (CN); Man Kit Wong, Kowloon (HK)

(73) Assignee: Senko Advanced Components, Inc., Marlborough, MA (US)

(*) Notice: Subject to any disclaimer, the term of this patent is extended or adjusted under 35 U.S.C. 154(b) by 0 days.

(21) Appl. No.: 16/691,817

(22) Filed: Nov. 22, 2019

(65) Prior Publication Data

US 2020/0166711 A1 May 28, 2020

Related U.S. Application Data

(60) Provisional application No. 62/771,123, filed on Nov. 25, 2018.

(51) Int. Cl.
| | | |
|---|---|---|
| *G02B 6/36* | (2006.01) | |
| *G02B 6/38* | (2006.01) | |
| *F16F 1/10* | (2006.01) | |

(52) U.S. Cl.
CPC .............. *G02B 6/3821* (2013.01); *F16F 1/10* (2013.01); *G02B 6/3885* (2013.01)

(58) Field of Classification Search
CPC .. G02B 6/3821; G02B 6/3885; G02B 6/3869; G02B 6/406; G02B 6/36; F16F 1/10; F16F 1/048
See application file for complete search history.

(56) References Cited

U.S. PATENT DOCUMENTS

| | | |
|---|---|---|
| 3,721,945 A | 3/1973 | Hulls |
| 4,150,790 A | 4/1979 | Potter |
| 4,327,964 A | 5/1982 | Haesly |
| 4,478,473 A | 10/1984 | Frear |
| 4,762,388 A | 8/1988 | Tanaka |
| 4,764,129 A | 8/1988 | Jones |
| 4,840,451 A | 6/1989 | Sampson |
| 4,872,736 A | 10/1989 | Myers |
| 4,979,792 A | 12/1990 | Weber |
| 5,026,138 A | 6/1991 | Boudreau |
| 5,041,025 A | 8/1991 | Haitmanek |
| D323,143 S | 1/1992 | Ohkura |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

Fiber Optic Interconnect Solutions, Tactical Fiber Optic Connector Cables and Termini, 2006, Glenair, Inc. Glendale, California.

(Continued)

*Primary Examiner* — Jennifer Doan

(57) ABSTRACT

A spring body configured with a plural of spring segments formed along a longitudinal axis of the spring body. The spring segments form an opening along one side that is configured to accept one or more optical fibers, and secure the fiber bundle from being dislodged from a bore formed by the spring segments.

15 Claims, 17 Drawing Sheets

(56) References Cited

U.S. PATENT DOCUMENTS

| | | |
|---|---|---|
| 5,212,752 A | 5/1993 | Stephenson |
| 5,265,181 A | 11/1993 | Chang |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,418,875 A | 5/1995 | Nakano |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenott |
| 5,570,445 A | 10/1996 | Chou |
| 5,588,079 A | 12/1996 | Tanabe |
| 5,602,951 A | 2/1997 | Shiota |
| 5,684,903 A | 11/1997 | Kyomasu |
| 5,687,268 A | 11/1997 | Stephenson |
| 5,781,681 A | 7/1998 | Manning |
| 5,845,036 A | 12/1998 | De Marchi |
| 5,915,987 A | 6/1999 | Reed |
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,095,862 A | 8/2000 | Doye |
| 6,134,370 A | 10/2000 | Childers |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,240,228 B1 | 5/2001 | Chen |
| 6,247,849 B1 | 6/2001 | Liu |
| 6,250,817 B1 | 6/2001 | Lampert et al. |
| 6,276,840 B1 | 8/2001 | Weiss |
| 6,364,537 B1 | 4/2002 | Maynard |
| 6,379,052 B1 | 4/2002 | de Jong |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 * | 11/2002 | Shirakawa ............ G02B 6/381 385/78 |
| 6,530,696 B1 | 3/2003 | Ueda |
| 6,551,117 B2 | 4/2003 | Poplawski |
| 6,565,262 B2 | 5/2003 | Childers |
| 6,579,014 B2 | 6/2003 | Melton |
| 6,585,194 B1 | 7/2003 | Brhwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,811,321 B1 | 11/2004 | Schmalzigaug et al. |
| 6,854,894 B1 | 2/2005 | Yunker |
| 6,869,227 B2 | 3/2005 | Del Grosso |
| 6,872,039 B2 | 3/2005 | Ba |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| 7,207,724 B2 | 4/2007 | Gurreri |
| D543,124 S | 5/2007 | Raatikainen |
| D543,146 S | 5/2007 | Chen |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Martin |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kuda |
| 7,473,124 B1 | 1/2009 | Briant |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,699,533 B2 | 4/2010 | Milette |
| 7,712,970 B1 | 5/2010 | Lee |
| 7,824,113 B2 | 11/2010 | Wong |
| 7,837,395 B2 | 11/2010 | Lin |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Liu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel |
| 8,651,749 B2 | 2/2014 | Dainese Junior |
| 8,676,022 B2 | 3/2014 | Jones |
| 8,678,670 B2 | 3/2014 | Takahashi |
| 8,727,638 B2 | 5/2014 | Lee |
| 8,770,863 B2 | 7/2014 | Cooke |
| 9,052,474 B2 | 6/2015 | Jiang |
| 9,250,402 B2 | 2/2016 | Ishii |
| 9,310,569 B2 | 4/2016 | Lee |
| 9,366,829 B2 | 6/2016 | Czosnowski |
| 9,411,110 B2 | 8/2016 | Barnette, Jr. |
| 9,448,370 B2 | 9/2016 | Xue et al. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |
| 9,581,768 B1 | 2/2017 | Baca |
| 9,599,778 B2 | 3/2017 | Wong |
| 9,658,409 B2 | 5/2017 | Gniadek |
| 9,684,130 B2 | 6/2017 | Vaetch et al. |
| 9,684,136 B2 | 6/2017 | Cline |
| 9,684,313 B2 | 6/2017 | Chajec |
| 9,709,753 B1 | 7/2017 | Chang |
| 9,778,425 B2 | 10/2017 | Nguyen |
| 9,829,644 B2 | 11/2017 | Nguyen |
| 9,829,645 B2 | 11/2017 | Good |
| 9,829,653 B1 | 11/2017 | Nishiguchi |
| 9,835,804 B2 * | 12/2017 | Barwicz ............ G02B 6/4231 |

(56) References Cited

U.S. PATENT DOCUMENTS

| | | | |
|---|---|---|---|
| 9,869,825 B2 | 1/2018 | Bailey | |
| 9,880,361 B2 | 1/2018 | Childers | |
| 9,946,035 B2 | 4/2018 | Gtafson | |
| 9,971,103 B2 | 5/2018 | de Jong | |
| 10,031,296 B2 | 7/2018 | Good | |
| 2002/0168148 A1 | 11/2002 | Gililand et al. | |
| 2002/0172467 A1 | 11/2002 | Anderson | |
| 2002/0191919 A1 | 12/2002 | Nolan | |
| 2003/0053787 A1 | 3/2003 | Lee | |
| 2003/0063862 A1 | 4/2003 | Fillion | |
| 2003/0157825 A1 | 8/2003 | Kane | |
| 2004/0052473 A1 | 3/2004 | Seo | |
| 2004/0109646 A1 | 6/2004 | Anderson | |
| 2004/0136657 A1 | 7/2004 | Ngo | |
| 2004/0141693 A1 | 7/2004 | Szilagyi | |
| 2004/0161958 A1 | 8/2004 | Togami | |
| 2004/0234209 A1 | 11/2004 | Cox | |
| 2004/0247252 A1 | 12/2004 | Ehrenreich | |
| 2005/0111796 A1 | 5/2005 | Matasek | |
| 2005/0141817 A1 | 6/2005 | Yazaki | |
| 2006/0013539 A1 | 1/2006 | Thaler | |
| 2006/0089049 A1 | 4/2006 | Sedor | |
| 2006/0127025 A1 | 6/2006 | Haberman | |
| 2006/0160429 A1 | 7/2006 | Dawiedczyk | |
| 2006/0193562 A1 | 8/2006 | Theuerkorn | |
| 2006/0269194 A1 | 11/2006 | Luther | |
| 2006/0274411 A1 | 12/2006 | Yamauchi | |
| 2007/0025665 A1 | 2/2007 | Dean | |
| 2007/0028409 A1 | 2/2007 | Yamada | |
| 2007/0079854 A1 | 4/2007 | You | |
| 2007/0098329 A1 | 5/2007 | Shimoji | |
| 2007/0149062 A1 | 6/2007 | Long | |
| 2007/0230874 A1 | 10/2007 | Lin | |
| 2007/0232115 A1 | 10/2007 | Burke | |
| 2007/0243749 A1 | 10/2007 | Wu | |
| 2008/0008430 A1 | 1/2008 | Kwitsch | |
| 2008/0044137 A1 | 2/2008 | Luther | |
| 2008/0069501 A1 | 3/2008 | Mudd | |
| 2008/0101757 A1 | 5/2008 | Lin | |
| 2008/0226237 A1 | 9/2008 | O'Riorden | |
| 2008/0267566 A1 | 10/2008 | Lin | |
| 2009/0022457 A1 | 1/2009 | de Jong | |
| 2009/0028507 A1 | 1/2009 | Jones | |
| 2009/0047818 A1 | 2/2009 | Irwin | |
| 2009/0092360 A1 | 4/2009 | Lin | |
| 2009/0176401 A1 | 7/2009 | Gu | |
| 2009/0196555 A1 | 8/2009 | Lin | |
| 2009/0214162 A1 | 8/2009 | O'Riorden | |
| 2009/0220197 A1 | 9/2009 | Gniadek | |
| 2009/0220200 A1 | 9/2009 | Wong | |
| 2009/0245736 A1* | 10/2009 | Ahadian | G02B 6/4292 385/92 |
| 2009/0290839 A1 | 11/2009 | Lin | |
| 2009/0290938 A1 | 11/2009 | Asaoka | |
| 2010/0034502 A1 | 2/2010 | Lu | |
| 2010/0054668 A1 | 3/2010 | Nelson | |
| 2010/0092136 A1 | 4/2010 | Nhep | |
| 2010/0247041 A1 | 9/2010 | Szilagyi | |
| 2010/0061069 A1 | 11/2010 | Cole | |
| 2010/0284656 A1 | 11/2010 | Morra | |
| 2010/0322561 A1 | 12/2010 | Lin | |
| 2011/0044588 A1 | 2/2011 | Larson | |
| 2011/0131801 A1 | 6/2011 | Nelson | |
| 2011/0155810 A1 | 6/2011 | Taniguchi | |
| 2011/0177710 A1 | 7/2011 | Tobey | |
| 2011/0239220 A1 | 9/2011 | Gibson | |
| 2012/0099822 A1 | 4/2012 | Kuffel | |
| 2012/0155810 A1 | 6/2012 | Nakagawa | |
| 2012/0189260 A1 | 7/2012 | Kowalczyk | |
| 2012/0237177 A1 | 9/2012 | Minota | |
| 2012/0269485 A1 | 10/2012 | Haley | |
| 2012/0301080 A1 | 11/2012 | Gniadek | |
| 2013/0019423 A1 | 1/2013 | Srutkowski | |
| 2013/0071067 A1 | 3/2013 | Lin | |
| 2013/0089995 A1 | 4/2013 | Gniadek | |
| 2013/0094816 A1 | 4/2013 | Lin | |
| 2013/0121653 A1 | 5/2013 | Shitama | |
| 2013/0170797 A1 | 7/2013 | Ott | |
| 2013/0183012 A1 | 7/2013 | Cabanne Lopez | |
| 2013/0216185 A1 | 8/2013 | Klavuhn | |
| 2013/0259429 A1 | 10/2013 | Czosnowski | |
| 2013/0308915 A1 | 11/2013 | Buff | |
| 2013/0322825 A1 | 12/2013 | Cooke | |
| 2014/0016901 A1 | 1/2014 | Lambourn | |
| 2014/0023322 A1 | 1/2014 | Gniadek | |
| 2014/0050446 A1 | 2/2014 | Chang | |
| 2014/0056562 A1 | 2/2014 | Limbert | |
| 2014/0133808 A1 | 4/2014 | Hill | |
| 2014/0219621 A1 | 8/2014 | Barnette | |
| 2014/0226946 A1 | 8/2014 | Cooke | |
| 2014/0241644 A1 | 8/2014 | Kang | |
| 2014/0241678 A1 | 8/2014 | Bringuier | |
| 2014/0241688 A1 | 8/2014 | Isenhour | |
| 2014/0334780 A1 | 11/2014 | Nguyen | |
| 2014/0348477 A1 | 11/2014 | Chang | |
| 2014/0370021 A1 | 12/2014 | Lazar et al. | |
| 2015/0003788 A1 | 1/2015 | Chen | |
| 2015/0111417 A1 | 4/2015 | Vanderwood | |
| 2015/0198766 A1 | 7/2015 | Takahashi et al. | |
| 2015/0212282 A1 | 7/2015 | Lin | |
| 2015/0241644 A1 | 8/2015 | Lee | |
| 2015/0301294 A1 | 10/2015 | Chang | |
| 2015/0331201 A1 | 11/2015 | Takano | |
| 2015/0355417 A1 | 12/2015 | Takano | |
| 2015/0378113 A1 | 12/2015 | Good | |
| 2016/0131849 A1 | 5/2016 | Takano | |
| 2016/0138343 A1 | 5/2016 | Dean, Jr. et al. | |
| 2016/0172852 A1 | 6/2016 | Tamura | |
| 2016/0178852 A1 | 6/2016 | Takano | |
| 2016/0291262 A1 | 6/2016 | Chang | |
| 2016/0195682 A1 | 7/2016 | Takano | |
| 2016/0259135 A1 | 9/2016 | Gniadek | |
| 2016/0266326 A1 | 9/2016 | Gniadek | |
| 2016/0320572 A1 | 11/2016 | Gniadek | |
| 2016/0349458 A1 | 12/2016 | Murray | |
| 2016/0370545 A1 | 12/2016 | Jiang | |
| 2017/0003458 A1 | 1/2017 | Gniadek | |
| 2017/0205587 A1 | 7/2017 | Chang et al. | |
| 2017/0205590 A1 | 7/2017 | Bailey et al. | |
| 2017/0205591 A1 | 7/2017 | Takano et al. | |
| 2017/0212316 A1 | 7/2017 | Takano et al. | |
| 2017/0276887 A1 | 9/2017 | Allen | |
| 2017/0277059 A1 | 9/2017 | Miura | |
| 2017/0343740 A1 | 11/2017 | Nguyen | |
| 2018/0024294 A1* | 1/2018 | Wang | G02B 6/3885 385/78 |
| 2018/0156988 A1 | 6/2018 | Gniadek | |
| 2018/0172923 A1 | 6/2018 | Bauco | |
| 2018/0291535 A1* | 10/2018 | Ridley | D02G 3/36 |
| 2019/0250344 A1 | 8/2019 | Takano | |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| EP | 1245980 B1 | 6/2006 |
| EP | 1566674 B1 | 5/2009 |
| GB | 2111240 A | 6/1983 |
| GB | 2111240 B | 9/1985 |
| JP | 2009229545 A | 10/2009 |
| JP | 2009276493 A | 11/2009 |
| TW | 200821653 A | 5/2008 |
| WO | 2001/079904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |

(56) References Cited

FOREIGN PATENT DOCUMENTS

| WO | 2012/162385 A1 | 11/2012 |
| WO | 2014/028527 A2 | 2/2014 |
| WO | 2014/182351 A1 | 11/2014 |
| WO | 2015/191024 A1 | 12/2015 |
| WO | 2015/148741 A1 | 9/2016 |

OTHER PUBLICATIONS

Fiber Optic Connectors and Assemblies Catalog, 2009, Huber & Suhner Fiber Optics, Herisau, Switzerland.
Fiber Optic Products Catalog, Nov. 2007, Tyco Electronics Coporation, Harrisburg, Pennsylvania.
Fiber Optic Connectors Tutorial, 2018, 20 pages.
Fiber Optic Glossary, Feb. 29, 2016, 93 pages.
ISR for PCT/US2019/013861, dated Apr. 8, 2019, 3 pages.
WO for PCT/US2019/013861, dated Apr. 8, 2019, 11 pages.

\* cited by examiner

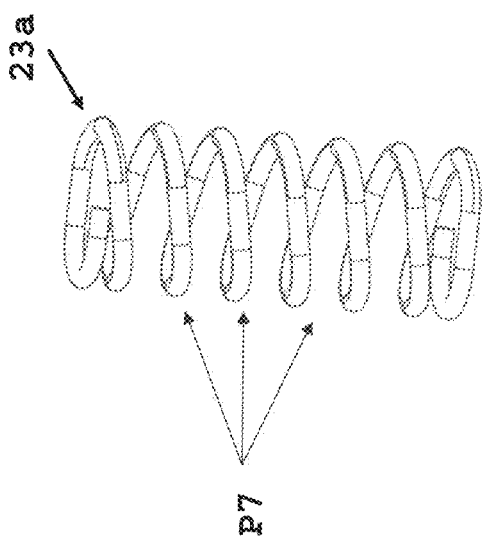
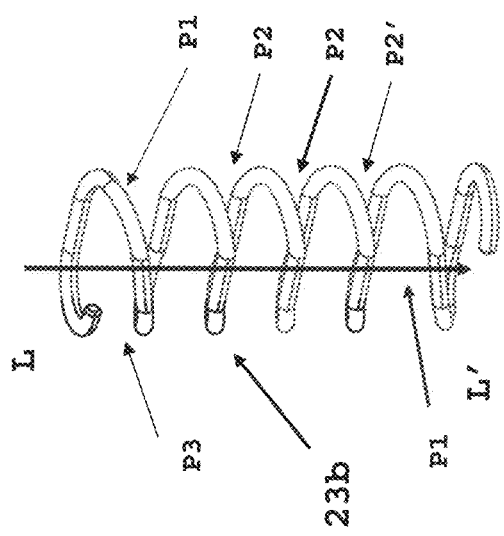
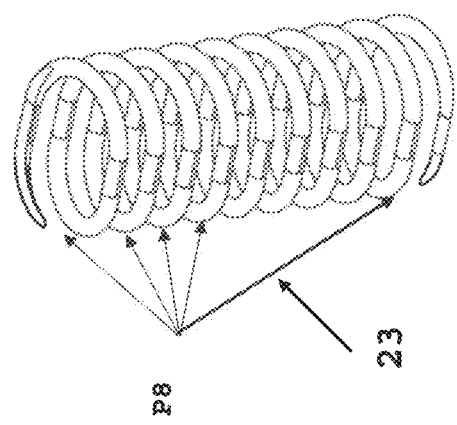
FIG. 2B (Prior Art)
FIG. 2C (Prior Art)
FIG. 2A (Prior Art)

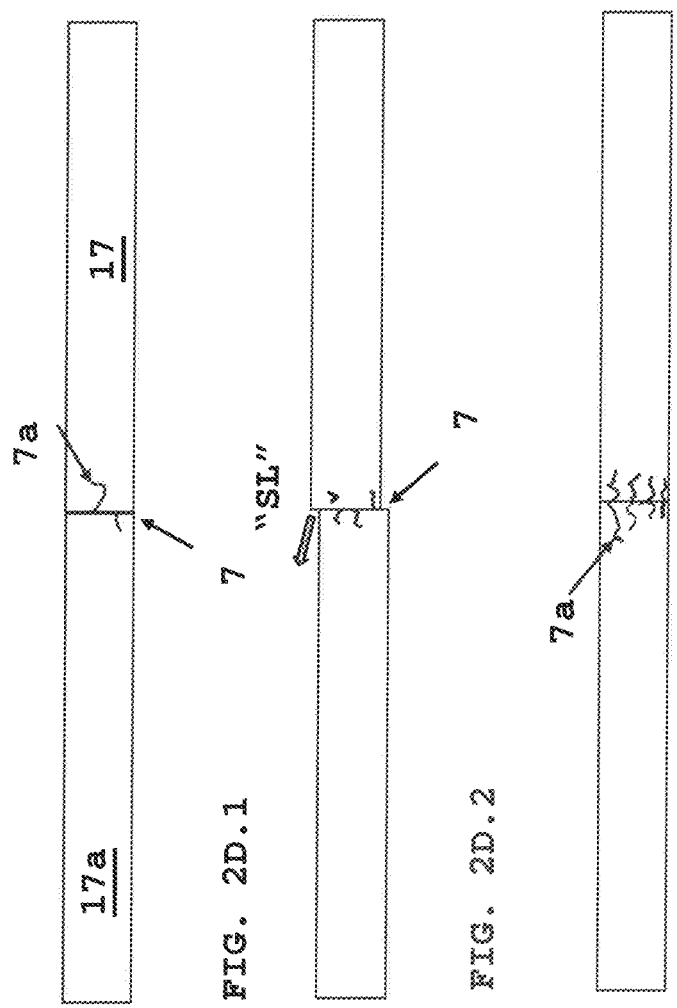

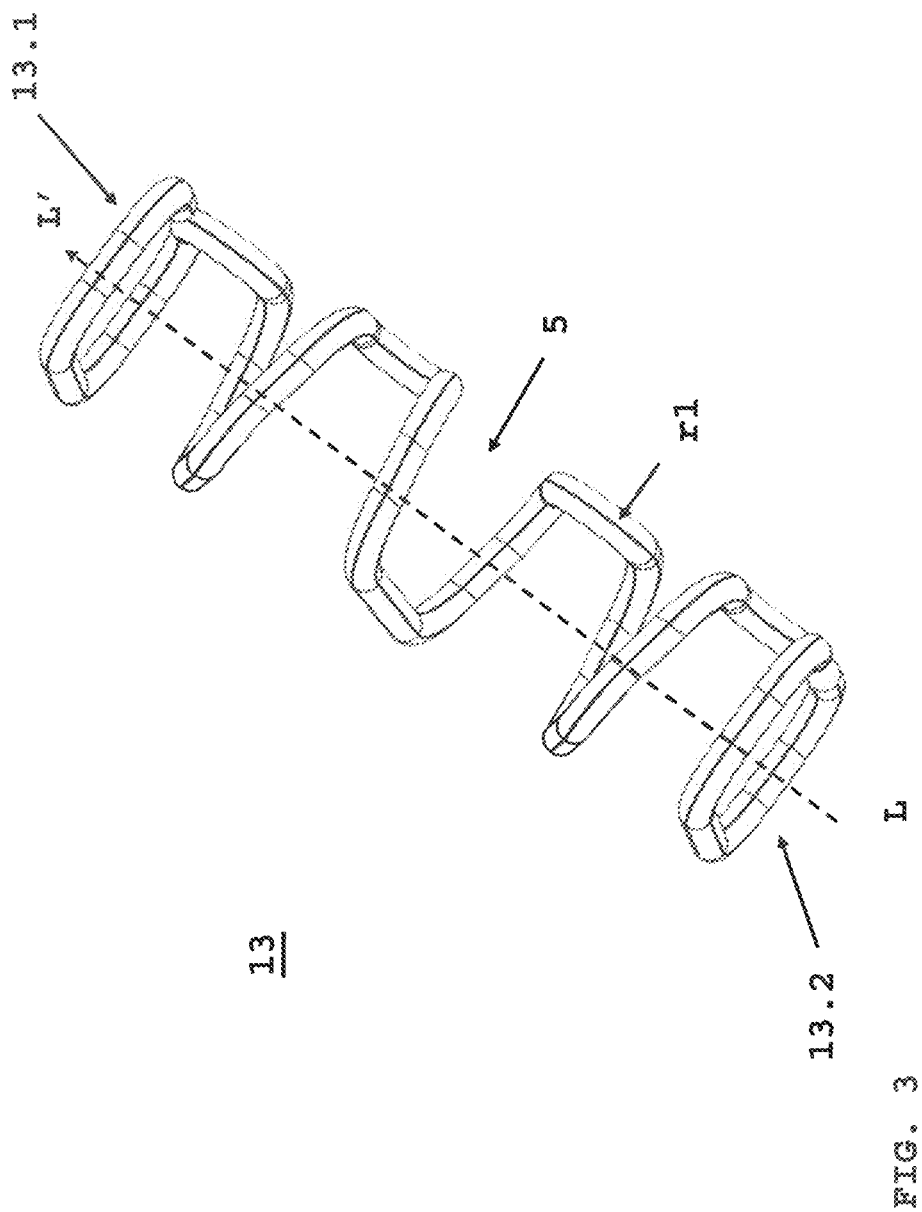

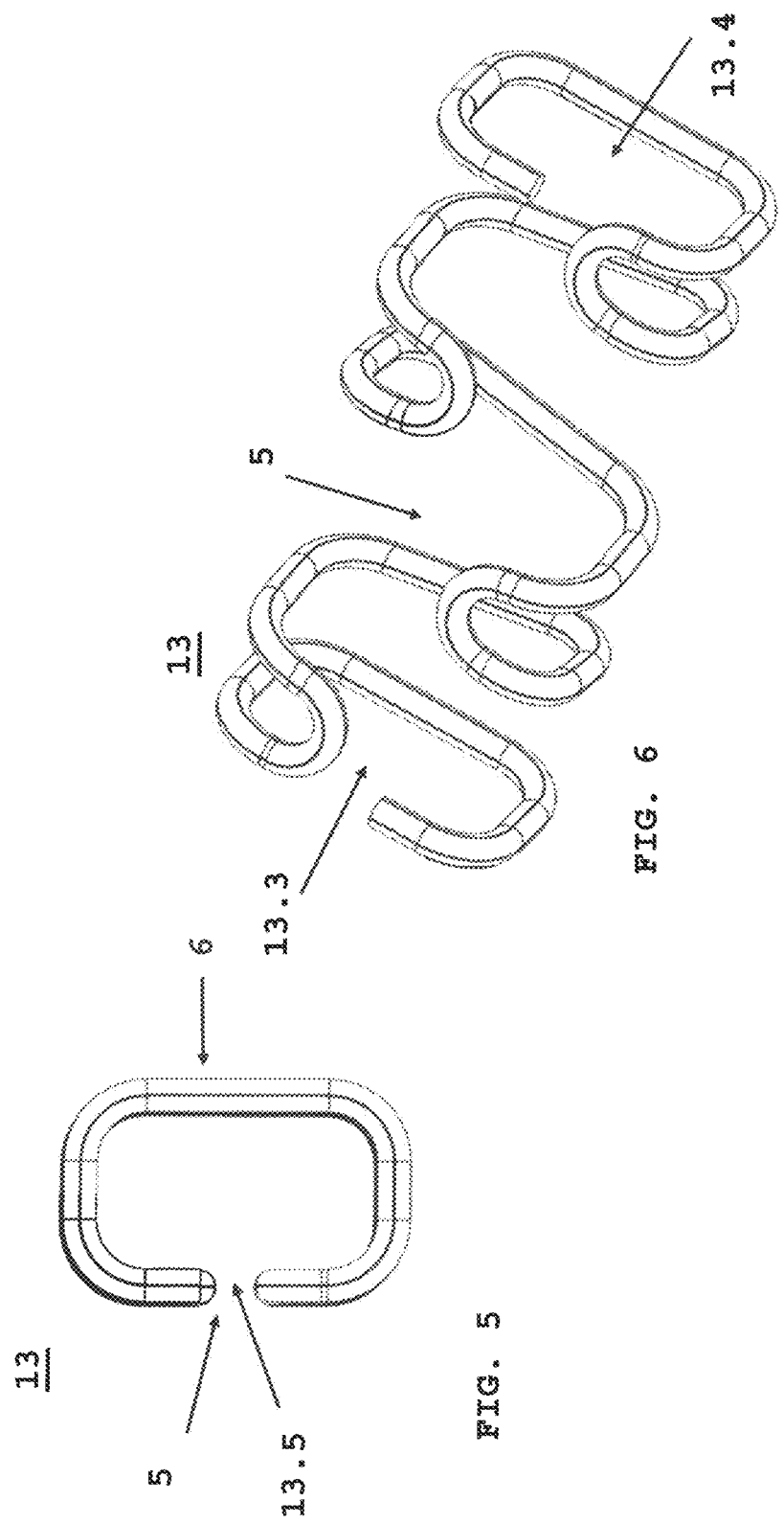

OPEN ENDED SPRING BODY FOR USE IN AN OPTICAL FIBER CONNECTOR

CROSS-REFERENCE TO RELATED APPLICATION

The present invention claims priority to U.S. Provisional Patent Application No. 62/771,123, filed on Nov. 25, 2018, the disclosure of which is incorporated by reference herein.

FIELD OF THE INVENTION

The present invention relates to optical connectors in general and, more particularly, to optical connectors deploying a spring body that can be installed about one or more optical fibers after splicing or connecting opposing optical fibers to terminate a ferrule with the fiber optic cable having the one or more optical fibers.

BACKGROUND

Demand for bandwidth by enterprises and individual consumers continues to rise exponentially. To meet this demand, fiber optics have become the standard cabling medium. Fiber optics relies on individual optical fibers of glass or polymers that are on the order of 250 microns in diameter. Data centers use high-density cabling, with individual fiber optic cables containing one or more optical fibers. Typically, in these high-density environments, MPO (multiple push on) connectors are used for connecting multiple optical fibers from a single multi-fiber cable. Fiber counts may be, for example, 8, 16, 32, or 64 fibers. MPO optical connectors optical fibers are subject to stresses at a splice point during assembly. The MPO connector is a multi-fiber push-on, push-off connector. The LC connector is a two-ferrule fiber optic connector used in data center applications. These stress cab break or introduce stress-cracks near or at the joint formed by splicing the optical fiber connector pigtail to an incoming optical fiber. These stress lead to future product failure including reduce optical transmission performance. FIGS. 2D.1-2D.3 depicts stress cracks at a splice point that occur after splicing. Deploying the prior art spring bodies stress cracks are increased as the user has to handle and move the optical fiber. The increased stress cracks, FIG. 2D.3 over FIG. 2D.1, leads to substantial signal loss (SL). Signal is defined by dB or decibels. The highest dB loss is at the splice point. dB is the signal strength measure and is also a measure of loss over a unit length of optical fiber. In some situations, infrared light can be seen leaving the stress crack. A splice point can be formed using fusion splicing or mechanical splicing. The splice point can be formed within an ingress protected outdoor connector.

Further, current optical connectors typically use many small components assembled into a single connector. An example of a prior art connector is depicted in FIG. 1A (exploded view) of MPG fiber optic connector (50) deploying prior art spring (23), and FIG. 1B (exploded view) that depicts second LC type fiber optic connector (60) deploying prior art springs (23). Prior art connectors (50, 60) generally includes dust cap (10a), connector housing (10) that includes ferrule assembly (11, 12, 14) biased by one or more spring (23) and back body (15) secured to a distal end of connector housing (10). Springs (23) bias the ferrule assembly forward to ensure a low insertion signal loss between opposing connectors. A cable boot (20) is secured with crimp ring (19) to a distal end of the back body. A fiber optic cable with one or more optical fibers (17) is passed through the cable boot, the back body and a longitudinal bore formed as part of springs (23). At a distal end of ferrules (11) is a pigtail or short length of optical fiber that optical fiber (17) is spliced with forming a splice point. Splice point (7) ends up within the spring bore due to the pigtail length, therefore desirable to use the spring as protection about the splice point. FIG. 1A connector is disclosed in Applicant's granted U.S. Pat. No. 9,658,408B2 "Optical Fiber Connector with Changeable Polarity", granted May 23, 2017, Gniadek et. al., width is fully incorporated by reference into this application. FIG. 1B connector is disclosed in Applicant's wanted U.S. Pat. No. 10,185,100B2, "Modular Connector and Adapter Assembly Using a Removable Anchor Device", granted Jan. 22, 2019, Ta no et. al., which is fully incorporated by reference into this application.

Using a prior art spring creates assembly problems, Spring (23, 23a, 23b) needs to be pre-loaded or assembled about optical fiber (17), from the splice point and then assembled to the connector. Spring (23, 23a, 23b) interferes with splicing and can lead to increased stress cracks (7a) depicted in FIG. 2D.3. Manufacture of the connector is complicated by the presence of these springs which must be carefully assembled between the main body and the connector housing. Further, the springs may fail by being bent or by having adjacent spring coils entangle one another. Thus, there is a need in the art for fiber optic connectors that reduce the assembly about the splice point, to ease assembly and reduce potential connector failure.

SUMMARY

A compressible spring body is provided having a plural of adjoining segments that forms a longitudinal bore for one or more optical fibers, and an opening along one side of the spring body configured to accept the optical fiber or optical fibers without distorting or twisting the fibers thereby reducing stress cracks in the optical fiber during assembly near or at a splice point along the optical fiber path.

BRIEF DESCRIPTION OF THE DRAWINGS

FIGS. 2A, 2B, and 2C depicts a number of prior art bias springs;

FIGS. 2D.1-2D.3 depicts splicing opposing optical fiber and the impact of stress cracking;

FIG. 3 is a perspective view of the spring body according to the present invention;

FIG. 5 is a perspective view at first end looking down the longitudinal bore of the spring body of FIG. 3;

FIG. 6 is a perspective off-set view of the side opening of along the longitudinal axis of the spring body of FIG. 3;

DETAILED DESCRIPTION

Figure 1A:
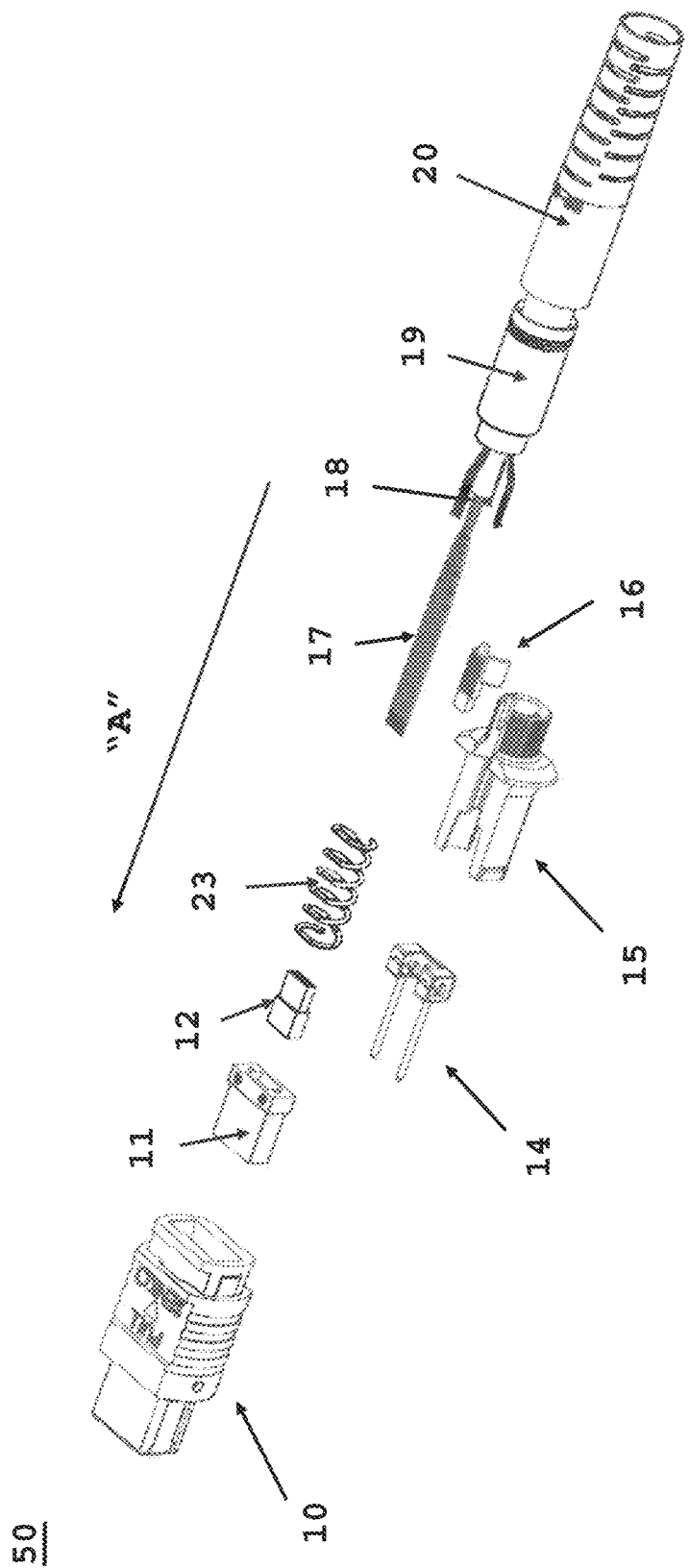
FIG. 1A is an exploded view of a prior art MPO fiber optic connector deploying a prior art bias spring.
Figure 1B:
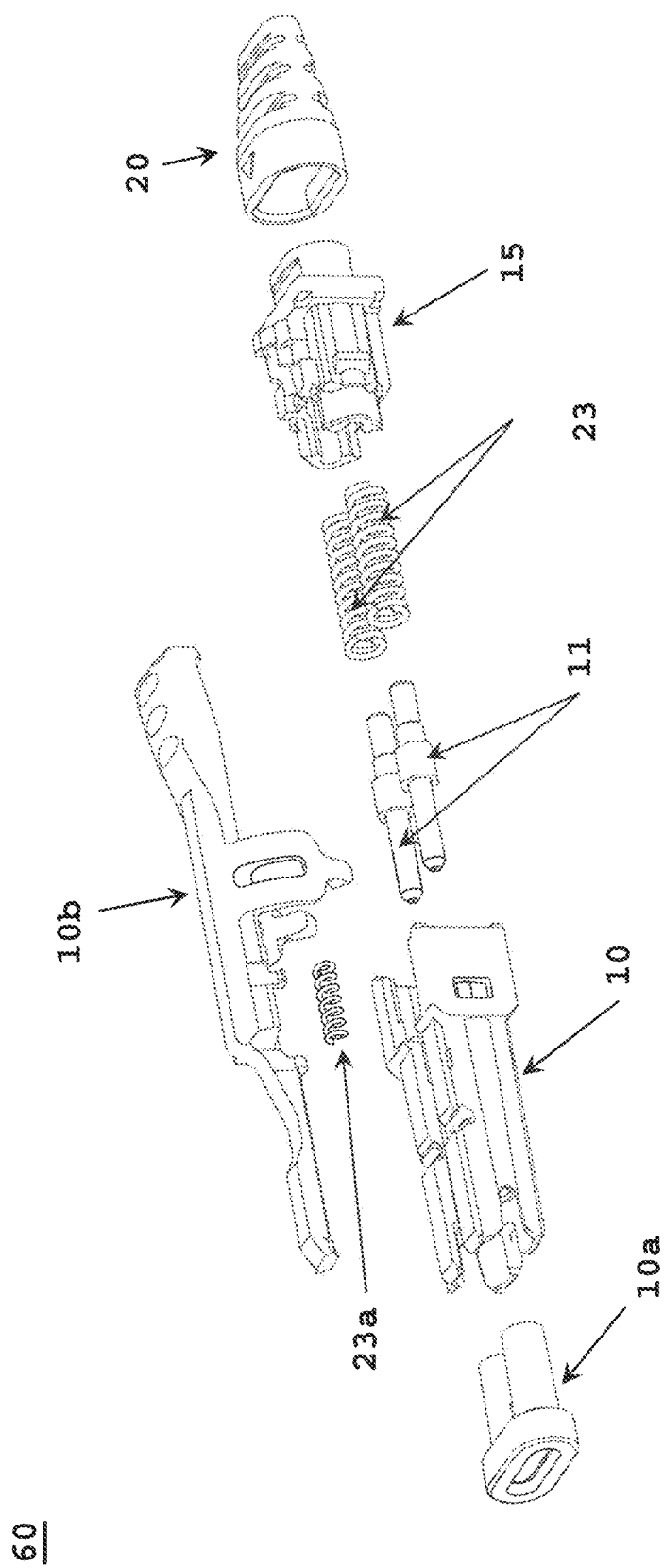
FIG. 1B is an exploded view of a prior art LC type fiber optic connector deploying a prior art bias spring set.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below. A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, an MPO connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable. As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals.

FIG. 2A depicts a prior art bias spring (23) with a small pitch between the coils or spring segments. The pitch is constant between the spring segments. There is no open slot along a longitudinal axis configured to accept optical fiber bundle (17). The fiber bundle enters the first end or the second end, but due to small pitch (P8) between the spring segments and the constant pitch, the fiber bundle undergoes more tension strain or twisting due to the more compressed turning radius of the spring segments. This creates more stress cracks at the splice point (refer to FIG. 2D.3). FIG. 2B depicts a second prior art bias spring (23a). The first end or second end openings are minimized to reduce bias spring by reducing pitch (P7) between the spring segments. This is due to reduced connector size. Connector size needs to decrease to increase data center capacity or foot print within an existing adapter. An adapter receives one or more fiber optic connectors. There is no open slot along the longitudinal axis or long side of spring (23a) due to small pitch between the spring segments. FIG. 2C depicts third prior art bias spring (23b) with varying pitch size (P1, P2, P2', P3) between the spring segments to reduce tension or twisting force at points along the bias spring with the purpose of reducing stress at the splice point. There is still stress about the splice point as the pitch between the spring segments cannot be reduce to zero as in the present invention with the opening along the longitudinal axis of spring body (13) (refer to FIG. 4).

Figure 4:
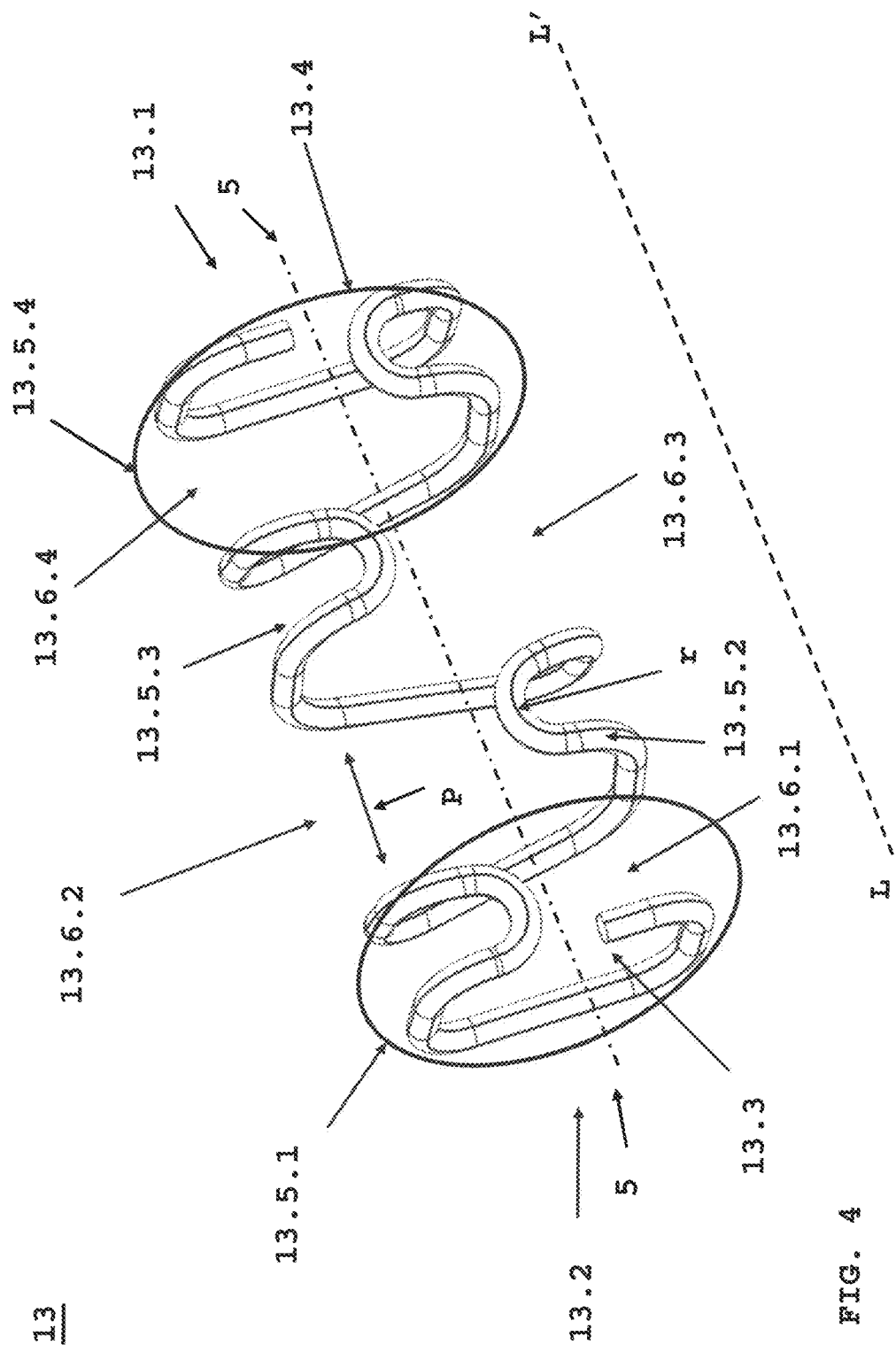
FIG. 4 is a perspective view of the side opening of along the longitudinal axis of the spring body of FIG. 3.
Figure 7:
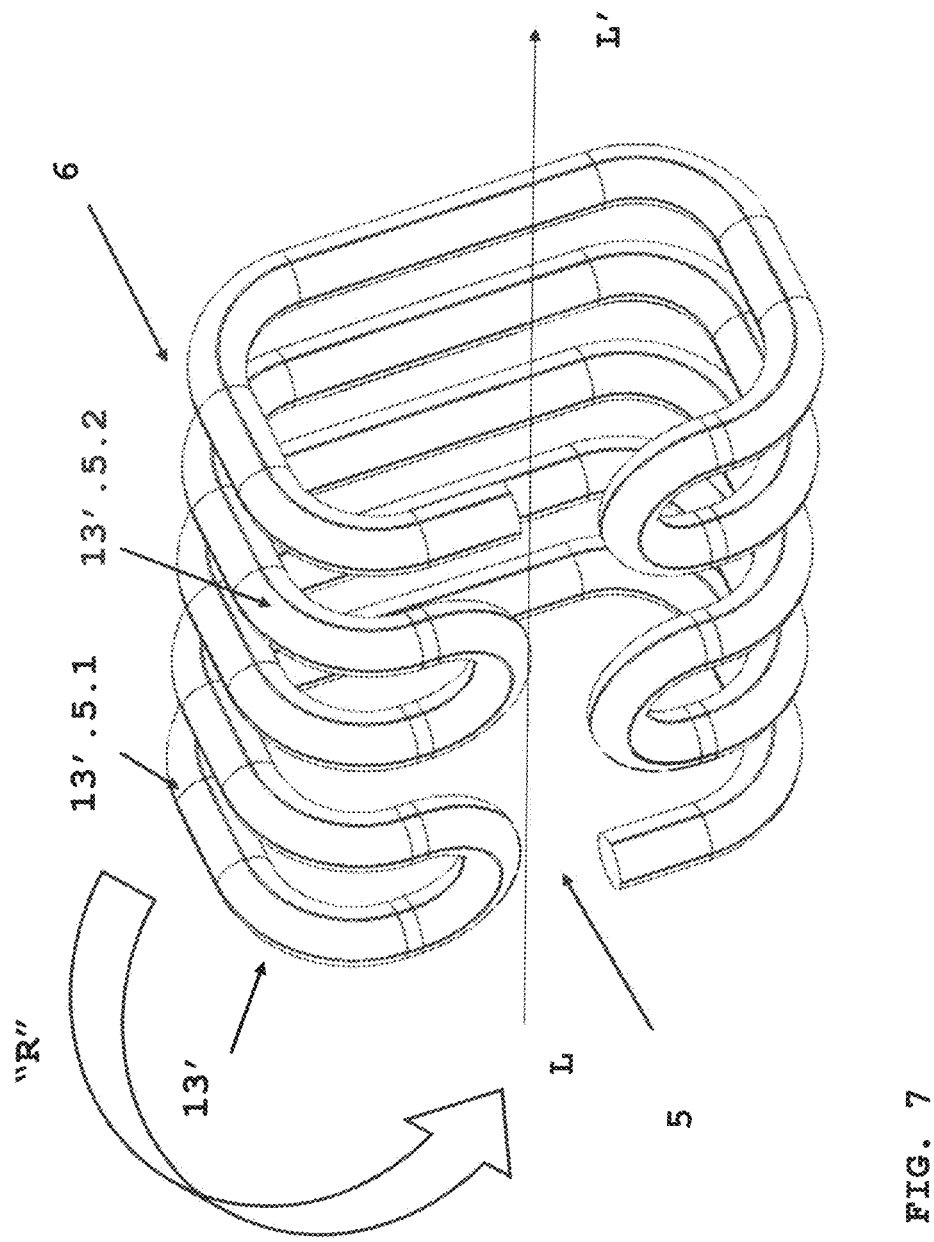
FIG. 7 depicts a perspective view along the spring body longitudinal axis L-L' and the rotation "R" direction when installing the spring body about an optical fiber.
Figure 8A:
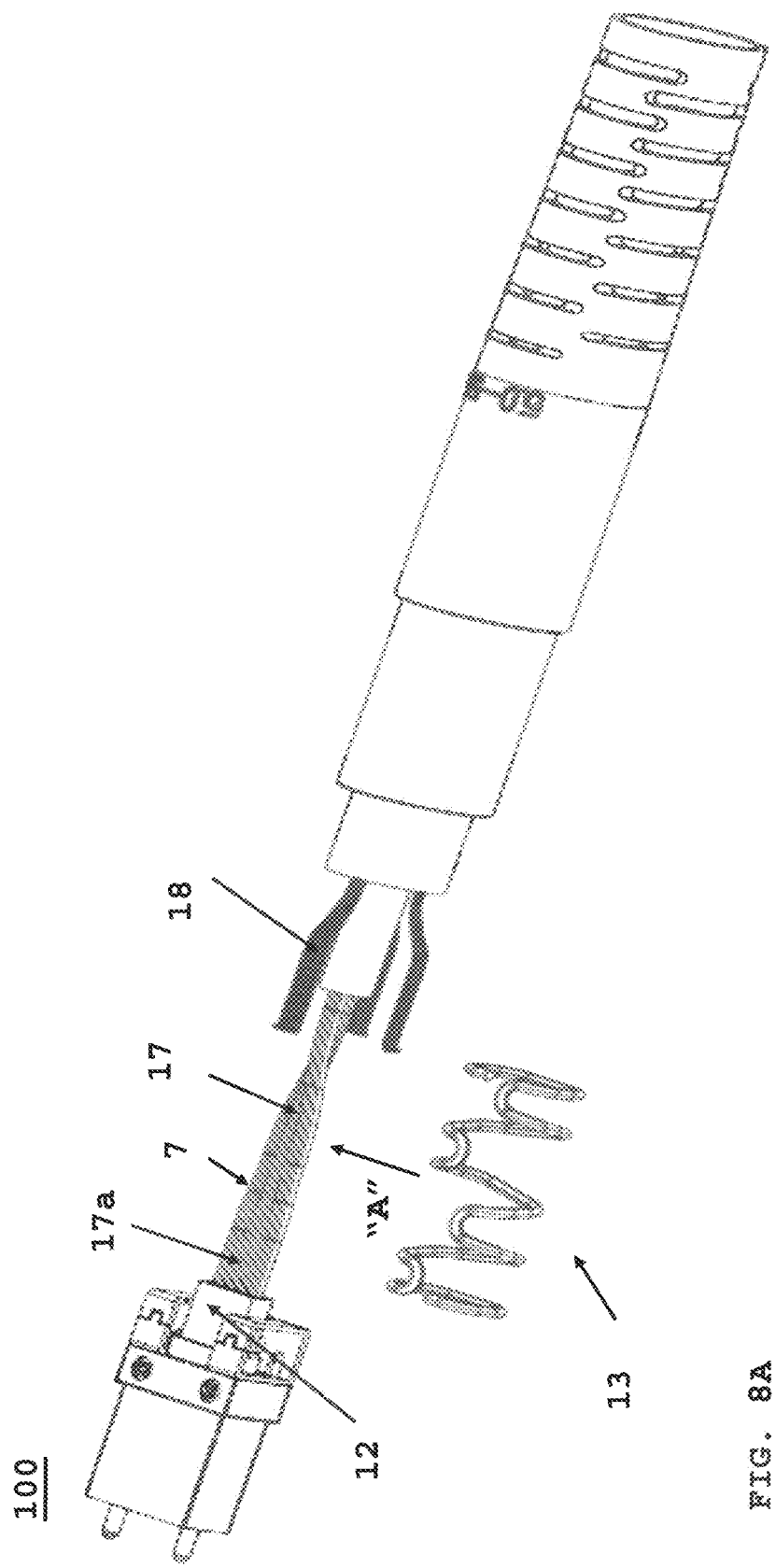
FIGS. 8A-8D illustrates, respectively, assembling the spring body about a plural of optical fibers after splicing the optical fibers to the pigtails of the ferrule.
Figure 8B:
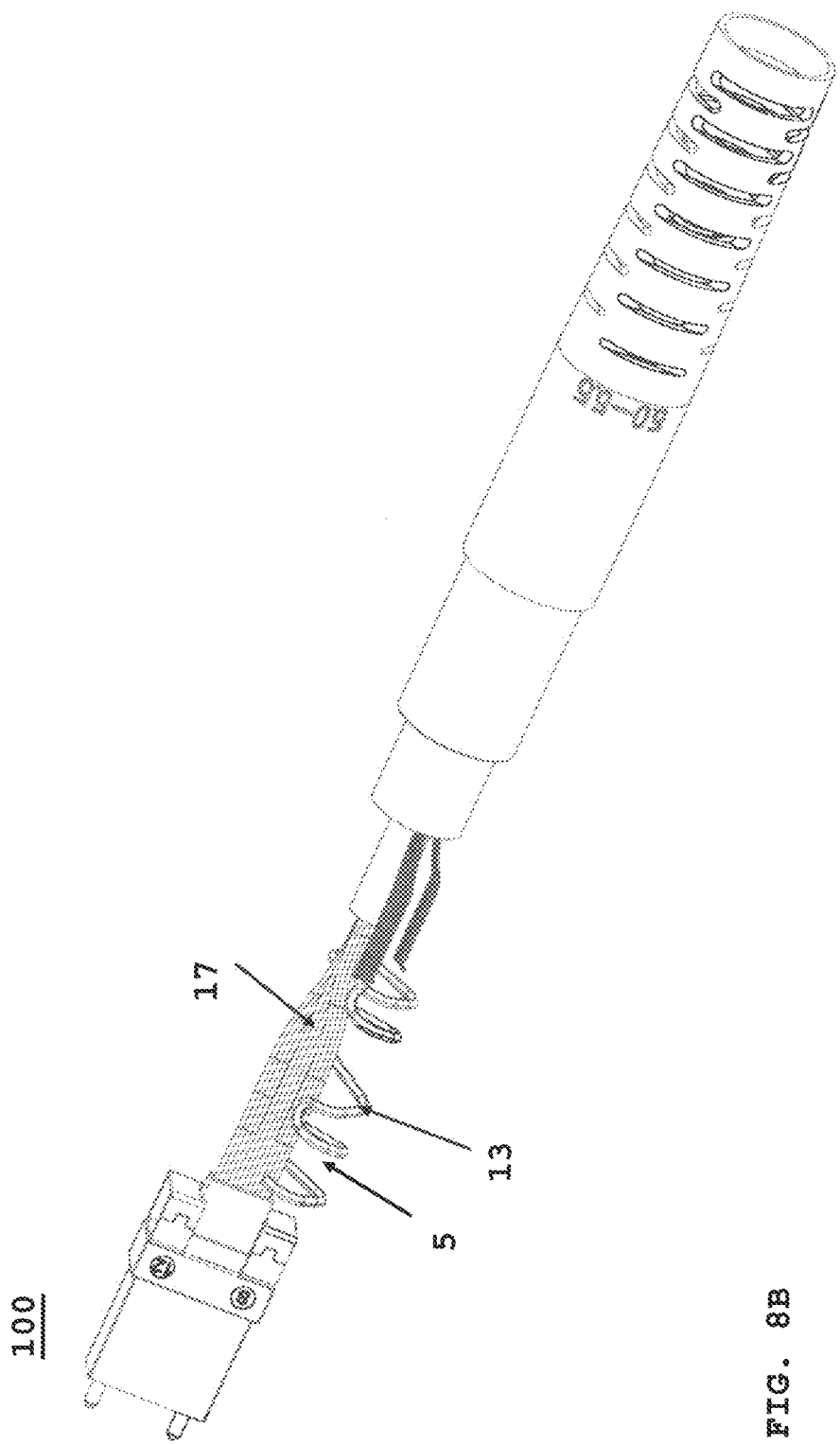
Figure 8C:
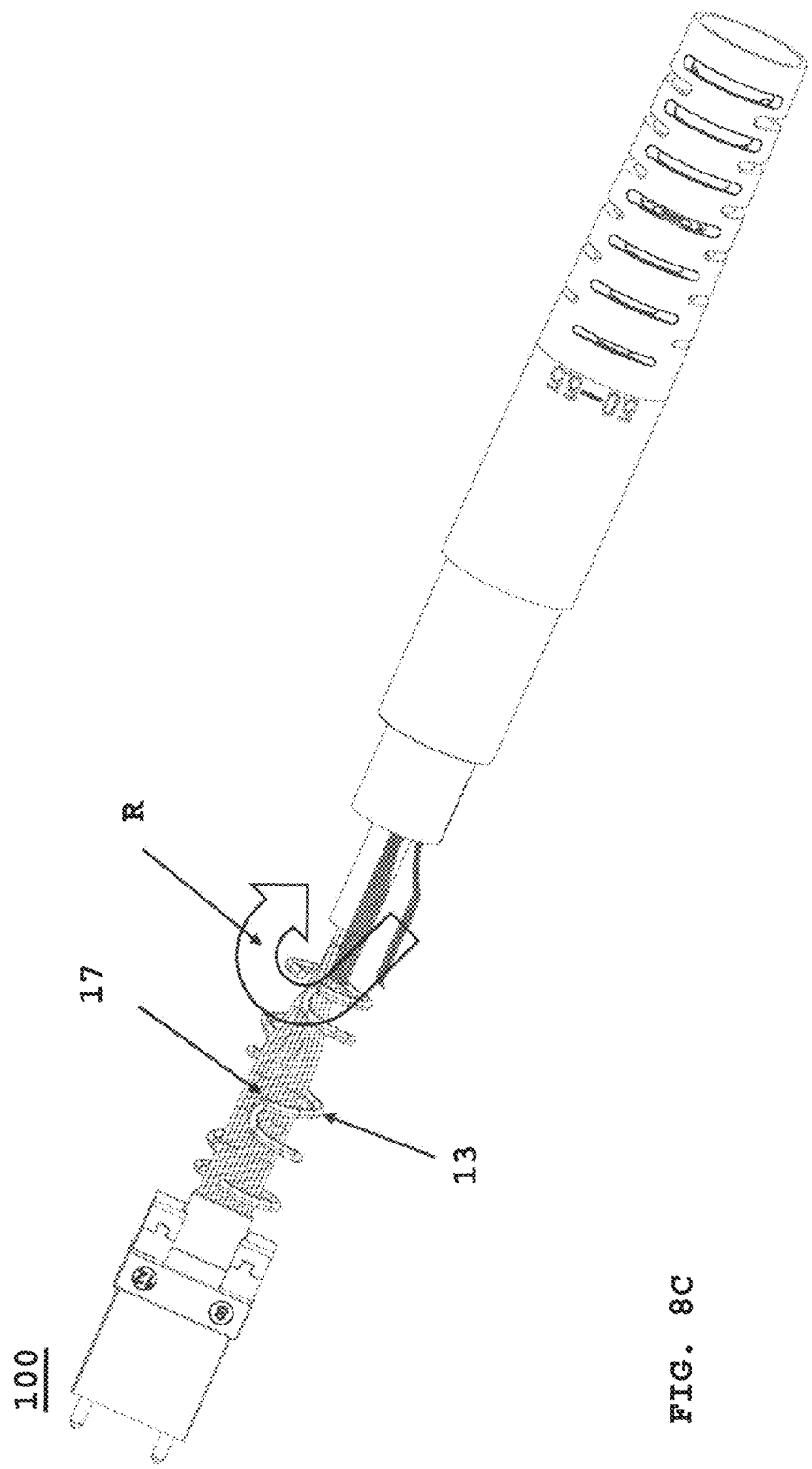
Figure 8D:
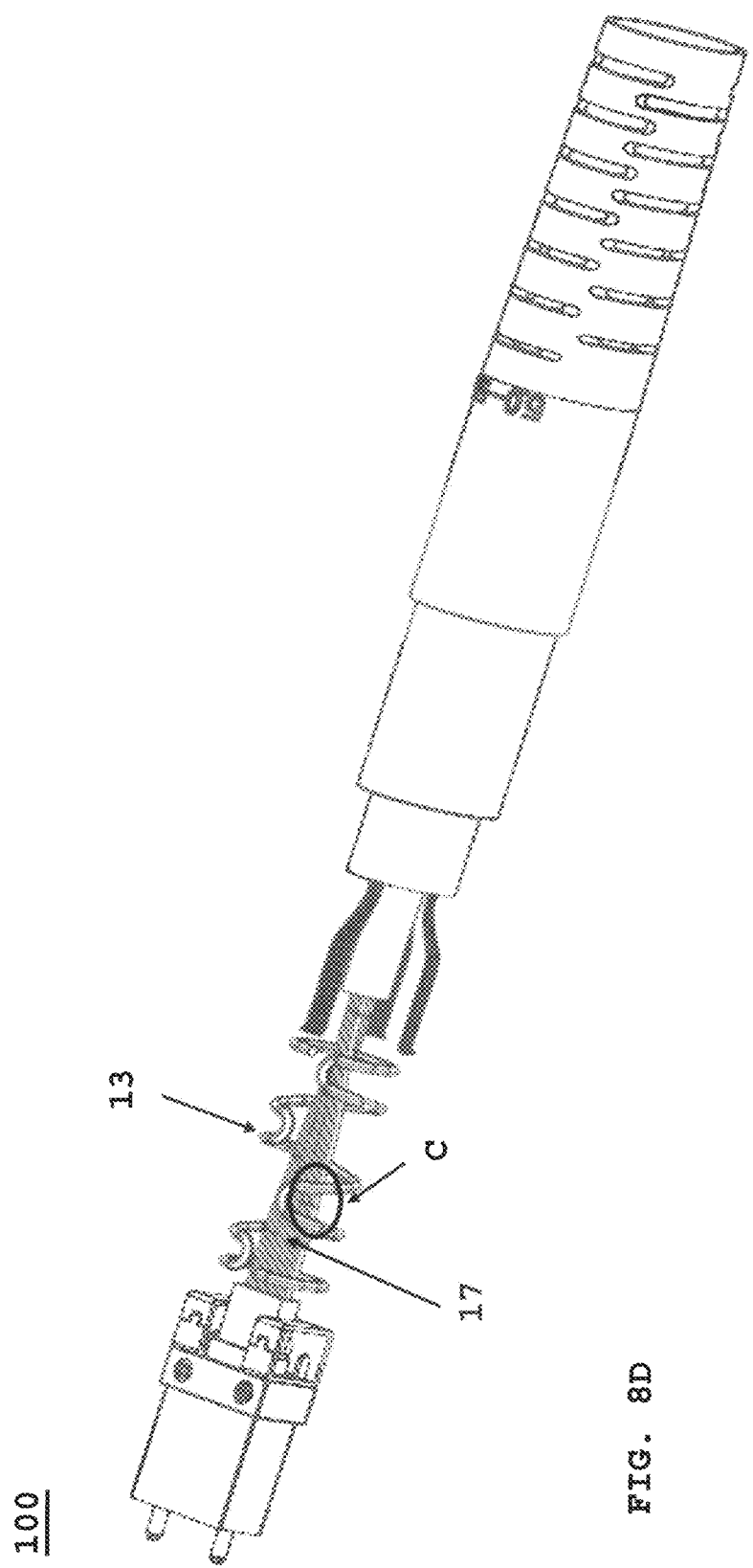
Figure 9:
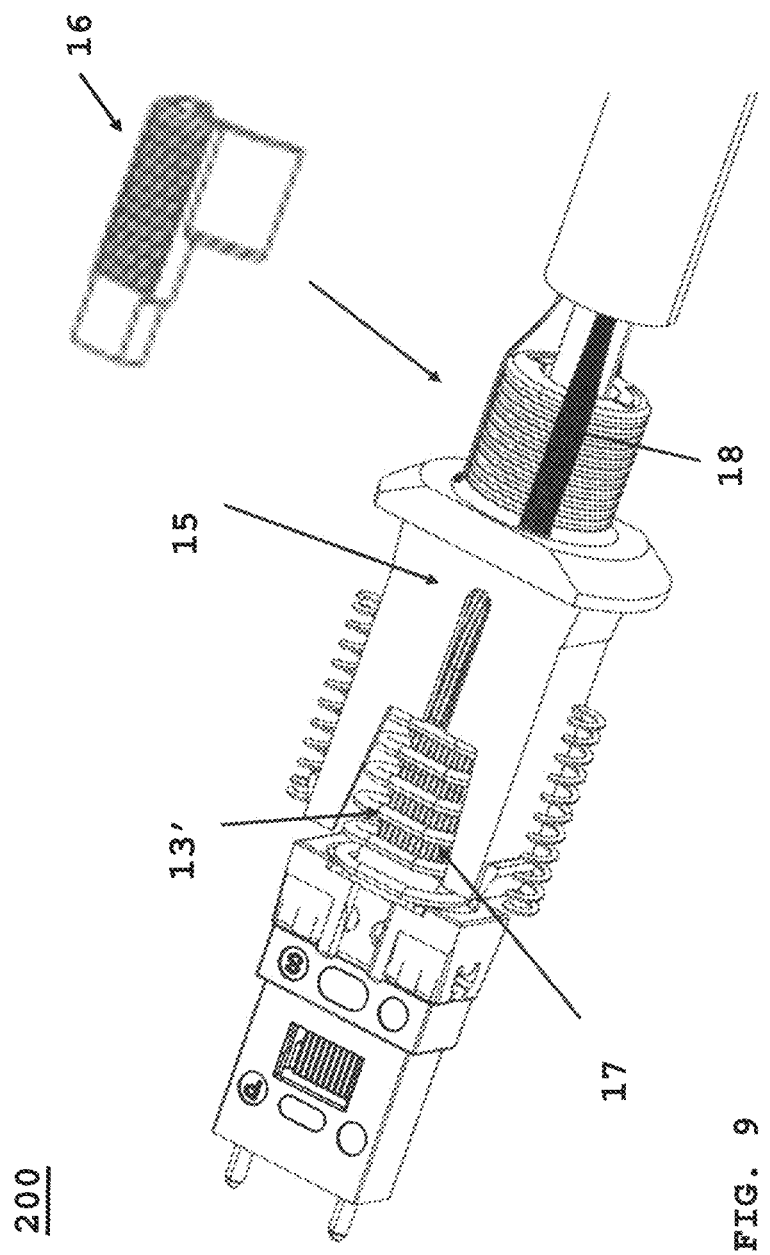
FIG. 9 is an assembled view of a second embodiment of the spring body, at FIG. 10B, deployed in the MPO connector of FIG. 1A.
Figure 10:
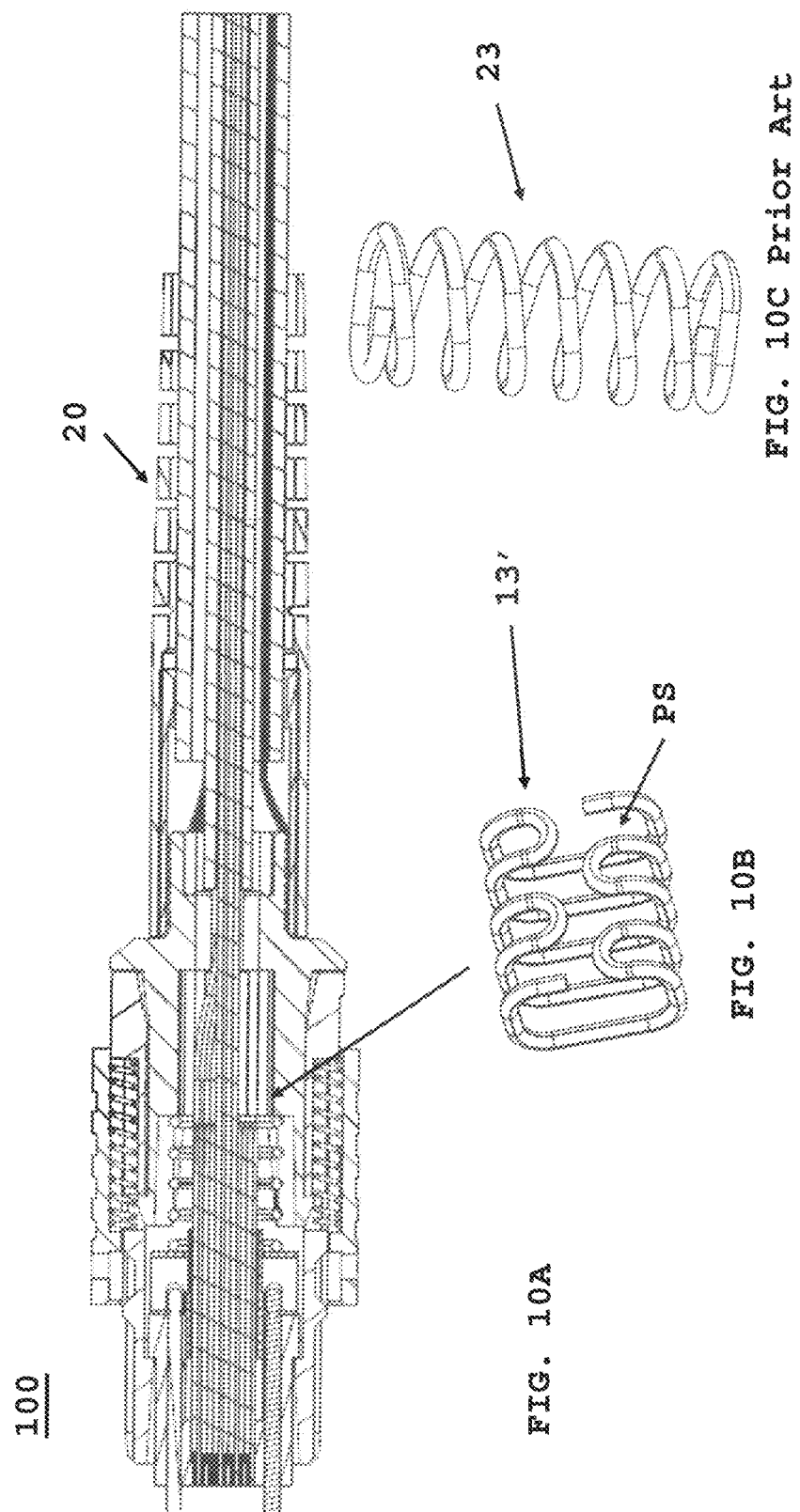
FIG. 10A is a cross-section of FIG. 9 assembly from a top view or Y-Z axis
FIG. 10B is a perspective view of a second embodiment of the spring body according to the present invention.
FIG. 10C is a perspective view of a prior art spring body previously deployed in the assembly of FIG. 10A.
Figure 11:
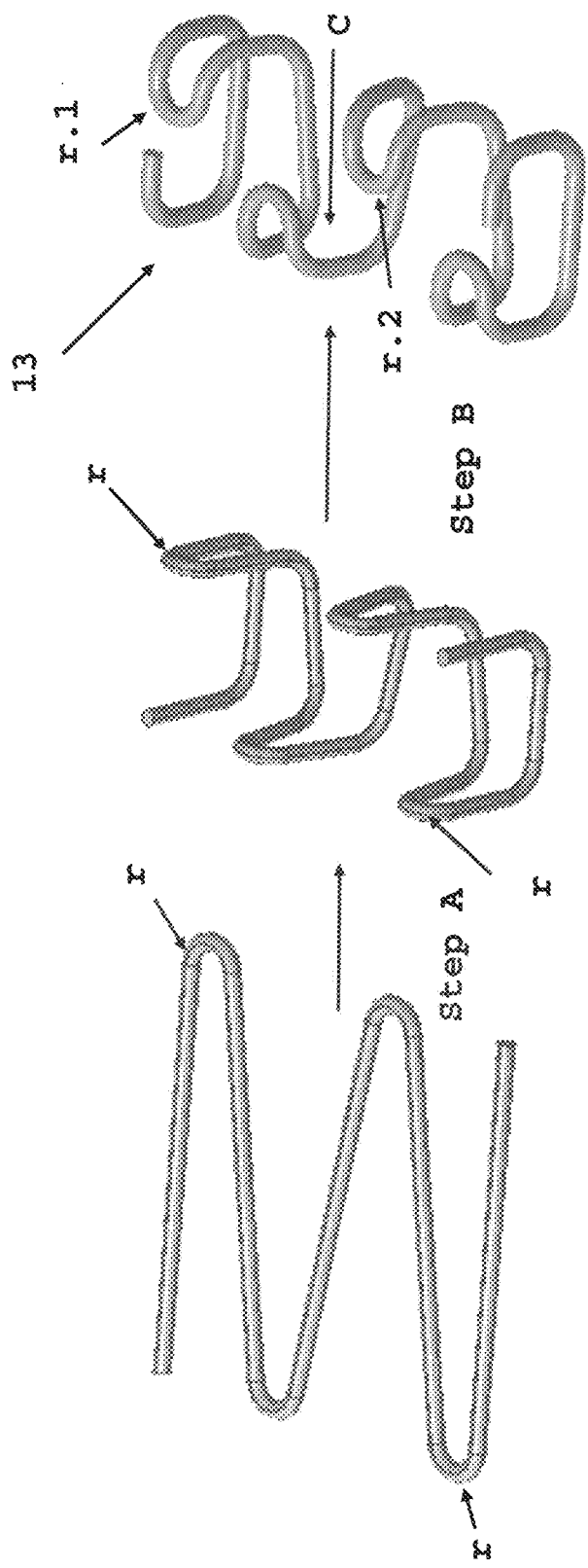
FIGS. 11A-11C depict, respectively, the assembly steps of forming the spring body of FIG. 3 according to the present invention.

FIG. 3 depicts a first embodiment of the present invention spring body (13). FIG. 10B depicts a second embodiment of the present invention spring body (13'). Spring Body (13, 13') is formed using sheet metal or similar compressible material, as depicted in FIGS. 11A-11C described below. When formed, spring body (13, 13') is open (5) along longitudinal length (L-L') from first end (13.1) to second end (13.2). FIG. 4 depicts a side view of spring body (13) illustrating opening (5) along longitudinal axis (L-L'). Along the axis are repeated spring segments (13.5.1, 13.5.2, 13.5.3) from first end 13.1 to second end 13.2. The spring segments form opening (5). Between spring segments (13.5,1, et. al.) are closed spring segments (13.6.1, 13.6.2, 13.6.3 and 13.6.4) along closed side (6) of spring body (13) (refer to FIG. 5), The number of closed and open spring segments depends on the length of the spring body needed. In the first embodiment of spring body (13), pitch "P" is constant between the spring segments. The pitch can be reduced substantially in FIG. 10B to accommodate small fiber optic connectors, where pitch (PS) is less than pitch (P) (refer to FIG. 4), Pitch is defined as the distance between the spring segments. First end opening (13.4) and second end opening (13.3) is configured to accept one or more optical fibers along within the spring segments. The end openings maybe larger or small depending the number of optical fibers in bundle (17). Without departing from the scope of the invention, the spring segments can have a varying radius (r) including a flat radius or perpendicular segment (r1) as depicted in FIG. 3. Radius (r) is positioned along opening (5) of the spring body, Radius (r) of first spring segment (13.5.1) is opposite second spring segment (13.5.2), and radius (r) of third spring segment (13.5.3) is opposite second spring segment (13.5.2) and third spring segment (13.5.3) is substantially in-line or in the same plane as first spring segment (13.5.1) as depicted in FIG. 4, FIG. 5 depicts an end view of spring body (13, 13') with open ended spring segment (13.5) forming opening (5) opposing closed end (6). FIG. 6 depicts spring body (13) slightly offset illustrating opening (5) along longitudinal axis L-U. First open end (13.4) to second open end (13.3) forms opening (5). FIG. 7 depicts a perspective view of second embodiment of spring body (13'). Compared with FIG. 3 spring body (13) the pitch between spring segments (13', 5.1, 13, 5.2) is smaller, along longitudinal axis (L-L') providing a smaller foot print or overall sized spring body for smaller fiber optic connectors. Spring body (13') opening (5) may be larger or smaller depending on the use of the spring body. To secure spring body (13, 13') about bundle (17), the spring body is inserted over the bundle though opening (5) and then rotated in direction "R" of arrow. This is described in FIGS. 8A-8D below, FIGS. 8A 8D depicts assembly spring body (13, 13') about bundle (17) spliced to pigtail (17a) protruding from ferrule body (12). Still referring to FIG. 8A, spring body (13) is assembled in direction of arrow "A" over splice point (7) formed when bundle (17) from the fiber optic cable is permanently connected to pigtail (17a). Splicing is a time intensive, field operation that results in increased signal loss (e.g. more positive dB) at the splice joint. This is due to stress cracks formed when the optical fibers are fused together using heat, or mechanically spliced. Also, the splice joint is physically weaker and thus more susceptible to breaking. Breakage or increase signal loss at the splice joint is not known until signal testing after the connector is assembled. As described in the present application, bending stress are added during assembly using prior art springs. This is due to the twisting of bundle (17) within spring (23) as the pitch size is very small. The prior art spring secured about the bundle, the splice is made and the prior art spring is move into position during assembly. As the prior art spring is moved into position during connector assembly, the small pitch size twist the optical fiber bundler putting stress on the splice point. With the present invention, assembly as depicted in FIGS. 8A-8D, the splice point is formed and spring is then positioned about the splice point and bundle (17) without twisting stress at splice point (7). FIG. 8B depicts step 2, spring body (13) opening (5) is aligned with one side of bundle (17) over the splice point. FIG. 8C depicts rotating in direction of arrow "R", spring body (13). Rotating continues until spring segments (13.5.1-13.5.3) are about bundle (17), and bundle (17) is fully within opening (5). FIG. 8D depicts a preferred rotation of spring body (13) about bundle (17). All spring segments (13.5.143.5.3) are about bundle (17). Connector (100) is formed with spring body (13) or spring (13') depending on the application and/or connector type and its needed spring pitch (P). As depicted in FIG. 8D, bundle (17) is secured within cavity (C) formed within spring segments (1.3.5.1, 13.6.1) (refer to FIG. 11C). FIG. 9 depicts back body (15) accepting spring body (13, 13') at a first end or proximal end, and strength members (18) are secured about a distal end of the back body about a threaded post to increase pull strength of the fiber optic cable at a distal end of the assembled connector. Cover (16) secures the strength members between the threaded post and the cover, Cable boot (20) is placed over the cover to form connector (100) as depicted in FIG. 10A.

Figure 12:
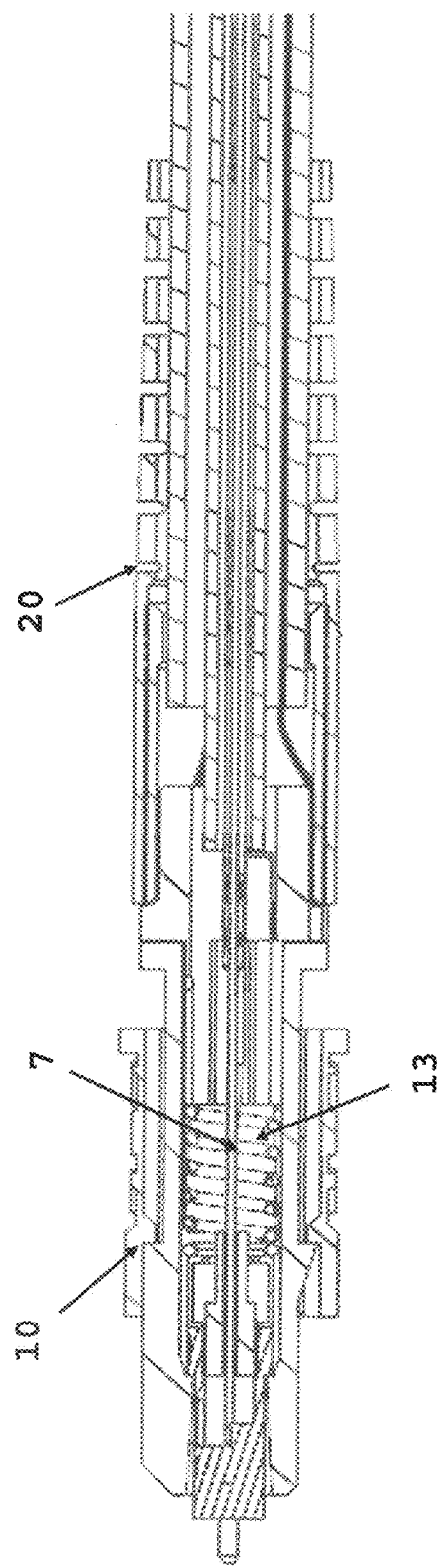
FIG. 12 is a cross-section of FIG. 9 along X-Y axis of the MPO connector.
Figure 13:
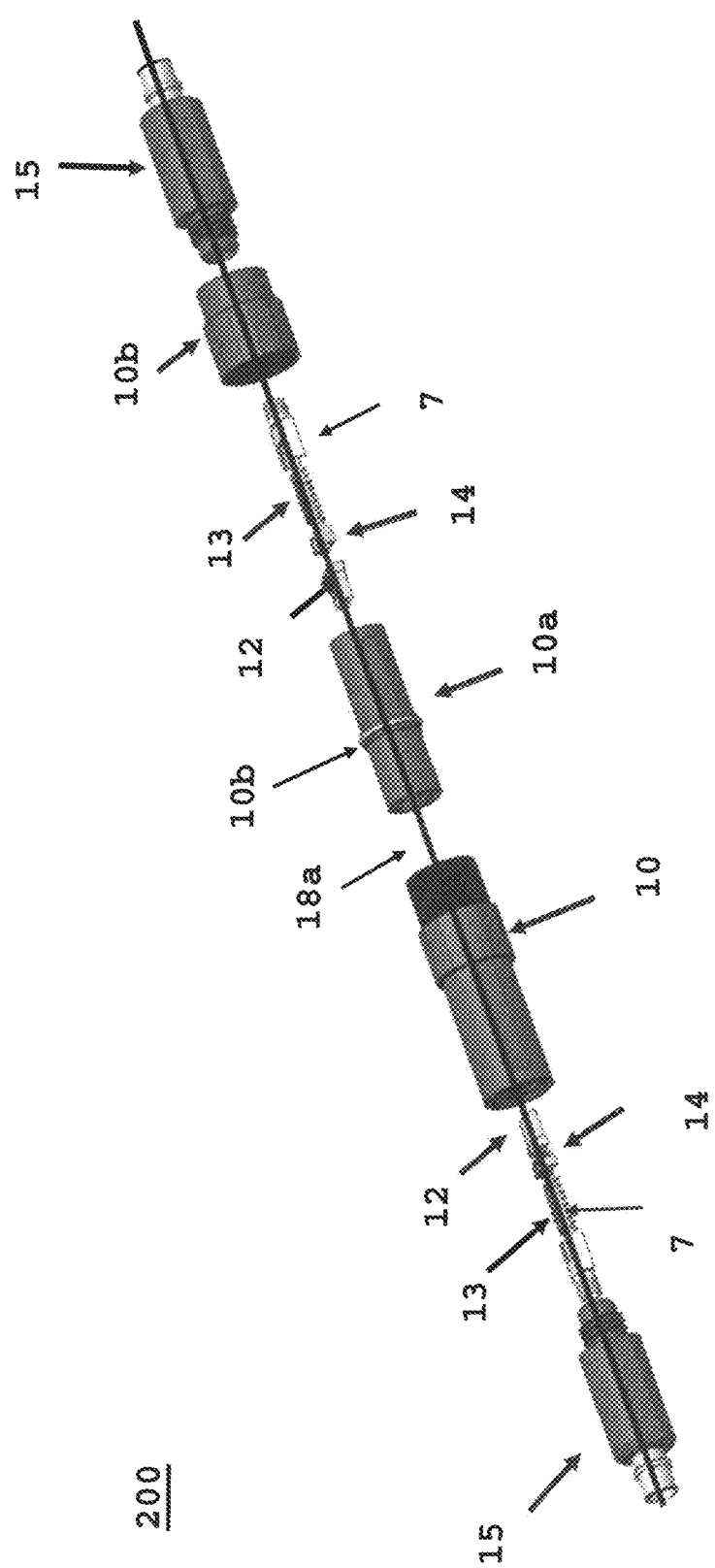
FIG. 13 is an exploded view of an ingress protected outdoor connector deploying the spring body to protect a splice point.

FIG. 10A depicts a cross-section allow the Y-Z axis or top of connector (100) with spring body (13') of FIG. 10B. As shown in FIG. 10C, prior art bias spring (23) cannot be rotated on bundle (17) as described in FIGS. 8A-8D. FIGS. 11A-11C depicts forming spring (13, 13'). FIG. 11A depicts sheet metal or similar compressible material formed in a "S" pattern within the X-Y plane or plane of a page, as Step A. At FIG. 11B, a spring segment is being formed by bending up, orthogonal to the "S" pattern or out of page or Z direction, radius (r). At FIG. 11C, radius (r) is further bent about ninety (90) degrees to the parallel in the X direction with alternating directions direction as shown between (r.1) and (r.2). FIG. 12 depicts a cross-section of connector (100) with spring body (13') about splice point (7). FIG. 13 depicts an outdoor rated, ingress protect connector (200) deploying spring body (13) place about a splice point within the outdoor connector. Connector (200) has a fiber optic cable (18a) that is spliced (7) to the pigtail optical fibers protruding from ferrule body (12), Outdoor connector (200) is formed when collar (10b) is threaded onto housing (10) which secures opposing MPO connectors within inner housing (10a). Connector (200) is outdoor rated when it deploys at least one seal (10b) to protect against the ingress of moisture and debris when the connector is used outside.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups, it will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in foe art would understand foe convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

in addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in tens of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A spring body for biasing a ferrule used in a fiber optic connector, comprising:
    the spring body is formed from a compressible material;
    the spring body forms a longitudinal axis from a first open end to a second open end,
    the spring body is open along the longitudinal axis on one side of the spring body such that the spring body defines an opening along said one side of the spring body, and wherein
    the opening is configured to accept and secure one or more optical fiber;
    wherein spring segments form the spring body, and each spring segment has an open end and a closed end;
    wherein a first spring segment is opposite a second spring segment, and a third spring segment is in-line with the first spring segment.

2. The spring body according to claim 1, wherein the spring body has a bore and the opening, and the bore of the spring body along the longitudinal axis is sized to accept and to secure a fiber optic ribbon cable.

3. The spring body according to claim 1, wherein the fiber optic connector is a multi-push on push-off or MPO connector.

4. The spring body according to claim 1, wherein the fiber optic connector is a LC connector.

5. The spring body according to claim 1, wherein the spring segments have a radius covering a portion of the opening.

6. The spring body according to claim 1 in combination with a connector housing, wherein the spring body is placed substantially about a splice point within the connector housing.

7. The spring body in combination with the connector housing according to claim 6, wherein the connector housing is formed as part of an outdoor rated connector.

8. A method of attaching a spring body about an optical fiber, comprising:
    providing a spring body according to claim 1;
    positioning the optical fiber within the spring body through an opening; and
    rotating the spring body about the optical fiber.

9. A spring body for biasing a ferrule used in a fiber optic connector, comprising:
    a resilient elongate member formed into a serpentine coil having a first end portion and a second end portion spaced apart along a longitudinal axis, the serpentine coil configured to be received in the fiber optic connector such that the first end portion is located adjacent the ferrule and the second end portion is located adjacent a spring push, the serpentine coil being resiliently compressible along the longitudinal axis between the ferrule and the spring push whereby the serpentine coil is configured to yieldably bias the ferrule forward in the fiber optic connector, the serpentine coil defining a central bore extending along the longitudinal axis from the first end portion through the second end portion, the serpentine coil extending circumferentially with respect to the longitudinal axis about the central bore, the serpentine coil further defining a side opening extending along the longitudinal axis from the first end portion through the second end portion, the side opening being configured such that one or more optical fibers of the fiber optic connector are passable radially with respect to the longitudinal axis through the side opening and into the central bore, the serpentine coil being configured to accept and secure the one or more optical fibers in the central bore.

10. The spring body as set forth in claim 9, wherein at least one of the first end portion of the serpentine coil and the second end portion of the serpentine coil comprises an incomplete hoop extending in a plane oriented generally perpendicular to the longitudinal axis.

11. The spring body as set forth in claim 9, wherein as the resilient elongate member extends in a first longitudinal direction from the first end portion toward the second end portion of the serpentine coil, the resilient elongate member alternates between extending in a first circumferential direction with respect to the longitudinal axis and a second circumferential direction with respect to the longitudinal axis, the second circumferential direction being opposite the first circumferential direction.

12. The spring body as set forth in claim 11, wherein the resilient elongate member includes one or more first turns at which the resilient elongate member turns from extending in the first circumferential direction to the second circumferential direction as the resilient elongate member extends in the first longitudinal direction and wherein the resilient elongate member includes one or more second turns at which the resilient elongate member turns from extending in the second circumferential direction to the first circumferential direction as the resilient elongate member extends in the first longitudinal direction.

13. The spring body as set forth in claim 12, wherein the side opening is located between the one or more first turns and the one or more second turns.

14. The spring body as set forth in claim 13, wherein the resilient elongate member includes a plurality of first turns.

15. The spring body as set forth in claim 14, wherein the resilient elongate member includes a plurality of second turns.

* * * * *